United States Patent [19]

Machida et al.

[11] 4,362,490
[45] Dec. 7, 1982

[54] MOLDING APPARATUS FOR STATOR OF ROTARY ELECTRIC MACHINE

[75] Inventors: Yosihiro Machida, Chiba; Kenichi Nakamura, Sakura; Takao Mifune, Ichikawa; Masayuki Sugishima, Sakura, all of Japan

[73] Assignee: Hitachi, Ltd., Tokyo, Japan

[21] Appl. No.: 282,169

[22] Filed: Jul. 10, 1981

[30] Foreign Application Priority Data

Jul. 11, 1980 [JP] Japan .................................. 55/93938

[51] Int. Cl.³ .............................................. B29C 6/00
[52] U.S. Cl. ..................................... 425/128; 249/95; 425/121
[58] Field of Search ............... 425/116, 117, 121, 127, 425/128, 129 R; 249/83, 95

[56] References Cited

U.S. PATENT DOCUMENTS

| 1,888,211 | 11/1932 | Apple .................................. 425/128 |
| 1,932,391 | 10/1933 | Apple .................................. 425/128 |
| 3,058,156 | 10/1962 | O'Connor ............................ 249/95 |
| 3,254,372 | 6/1966 | Hofbauer ......................... 425/129 X |
| 4,093,413 | 6/1978 | Schöllhorn et al. ............. 425/121 X |

Primary Examiner—J. Howard Flint, Jr.
Attorney, Agent, or Firm—Antonelli, Terry & Wands

[57] ABSTRACT

A molding apparatus for molding a coil of a stator of a rotary electric machine having a novel construction for fitting the stator readily to its mold enabling the molding operation to be continuously performed without interruption even if the thickness of the stator shows variations when fitted to the mold. The molding apparatus includes a pair of mold members, one mold member enclosing one coil end of the stator having a stator core and a coil wound thereon with a clearance therebetween and positioned against one end surface of the stator core disposed outwardly of the one coil end and the other mold member set on the inner periphery of the stator core and enclosing the other coil end of the stator with a clearance therebetween while being positioned against the other end surface of the stator core disposed outwardly of the other coil end. The two mold members are prevented from striking each other when the stator core is held therebetween. A plurality of runners are formed on the other mold member for communicating a first space formed between the first mold member and the one coil end with a second space formed between the second mold member and the other coil end.

7 Claims, 5 Drawing Figures

MOLDING APPARATUS FOR STATOR OF ROTARY ELECTRIC MACHINE

BACKGROUND OF THE INVENTION (1) Field of the Invention

This invention relates to molding apparatus for forming by molding the coil of a stator of a rotary electric machine, such as an electric motor, generator, etc., and more particularly it deals with the construction of a mold for forming the coil.

(2) Description of the Prior Art

In recent years, the concept of impregnating the coil of a stator of a rotary electric machine with a synthetic resinous material or applying a coat of such material to the coil for insulating or fixing same has become popular. In this case, there is raised the problem that what construction should the mold have or where the channels for injecting the resinous material should be located for improving productivity.

First of all, the idea came to mind was to cover the stator core and coil of the rotary electric machine completely with a resinous material. When the stator is covered with a resinous material, there is latitude to a certain extent in selecting the channels through which the resinous material is injected. However, this proposal has the disadvantages that a large volume of resinous material is consumed and the rotary electric machine becomes high in cost, and that it becomes difficult to obtain a compact overall size in a rotary electric machine.

The idea next came to mind was to limit the impregnation or coating of the stator to a position in the periphery of the coil, to reduce the consumption of the resinous material. In this case, the channels for injecting the resinous material therethrough into the machine can be advantageously provided in cutouts formed in the outer periphery of the stator core which is not in the form of a complete circle. An example of the mold based on this idea will be outlined by referring to FIGS. 1 and 2. As shown, the numeral 1 designates a stator including a stator core 2 having a coil 3 wound thereon. A mold includes a lower mold member 4 and an upper mold member 5. An intermediate mold member 6 for arranging runners 7 along cutouts formed in the stator core 2 is formed with a groove along the outer periphery of the stator core 2. The numeral 8 designates an intermediate mold member presser for forcing the intermediate mold member 6 against the outer periphery of the stator core 2. The lower mold member 4 includes a core 9 fitted to the inner periphery of the stator core 2, a groove 10 for positioning the intermediate mold member 6 around the stator core 2, and an inner surface 11 in spaced juxtaposed relation to the coil 3. Likewise, the upper mold member 5 includes an inner surface 12 in spaced juxtaposed relation to the coil 3, and a projection 13 positioned against the end surface of the core 9. A sprue 14 is formed in the upper mold member 5 and communicates with a space 15 defined by the upper mold member 5 and surrounding the coil 3, the outer peripheral surface of the stator core 2 and the intermediate mold member 6.

The process for molding the stator 1 by using the mold of the aforesaid construction will now be described. The stator core 2 is fitted at its inner peripheral surface to the core 9 of the lower mold member 4 and inserted until the inner peripheral side of the lower end surface of the stator core 2 abuts against an offset portion 16 of the core 9. Then the intermediate mold member 6 is engaged in the groove 10 and fixed around the stator core 2 by moving the intermediate mold member presser 8. Thereafter the upper mold member 5 is moved downwardly until the outer peripheral side of the end surface of the projection 13 of the upper mold member 5 abuts against the inner peripheral side of the upper end surface of the stator core 2. A resinous material in a molten state in injected under pressure through the sprue 14, to fill the space 15 with the resinous material and a space 17 formed in the lower mold member 4 through a slot and the runners 7 in the stator core 2. The stator 1 that has been molded can be removed following breakdown of the mold after the resinous material has set.

Some disadvantages are associated with the mold of the aforesaid construction. The mold is complex in construction and low in operation efficiency. It is a time-consuming operation to assemble and disassemble the stator 1 with the mold. A variation in the thickness of the stator core 2 occurring when it is fitted to the core 9 could not be accommodated, making it impossible to keep the mold airtight. For example, when the stator core 2 has an increased thickness when fitted to the core 9, gaps would be formed between the end surfaces of the core 9 and the projection 13 and between the upper die member 5 and intermediate die member 6 respectively, so that the resinous material would leak through the gaps from the mold cavity. Thus it has been essential to obtain a correct thickness of the stator core 2 when fitted to the core 9 of the lower mold member 4 because the molding operation would have to be interrupted under such condition.

SUMMARY OF THE INVENTION

Accordingly, an object of this invention is to provide a molding apparatus of simple construction enabling assembling an disassembling of the stator of a rotary electric machine to be readily effected for subjecting same to molding treatment.

Another object is to provide a molding apparatus enabling the molding operation to be continuously performed without interruption even if there are variations in the thickness of the stator core fitted to the core of the lower mold member.

The molding apparatus according to the invention comprises a pair of mold members each defining a space surrounding one coil end of a stator which are positioned against respective end surfaces of a stator core disposed outwardly of the coil ends while holding the stator core therebetween, and runners communicating with the cavity of the mold surrounding the opposite coil ends of stator. The mold is dimensioned and constructed such that when the stator core is fitted to the mold the mold members are prevented from directly striking each other.

DESCRIPTION OF THE PREFERRED EMBODIMENTS

Figure 1:
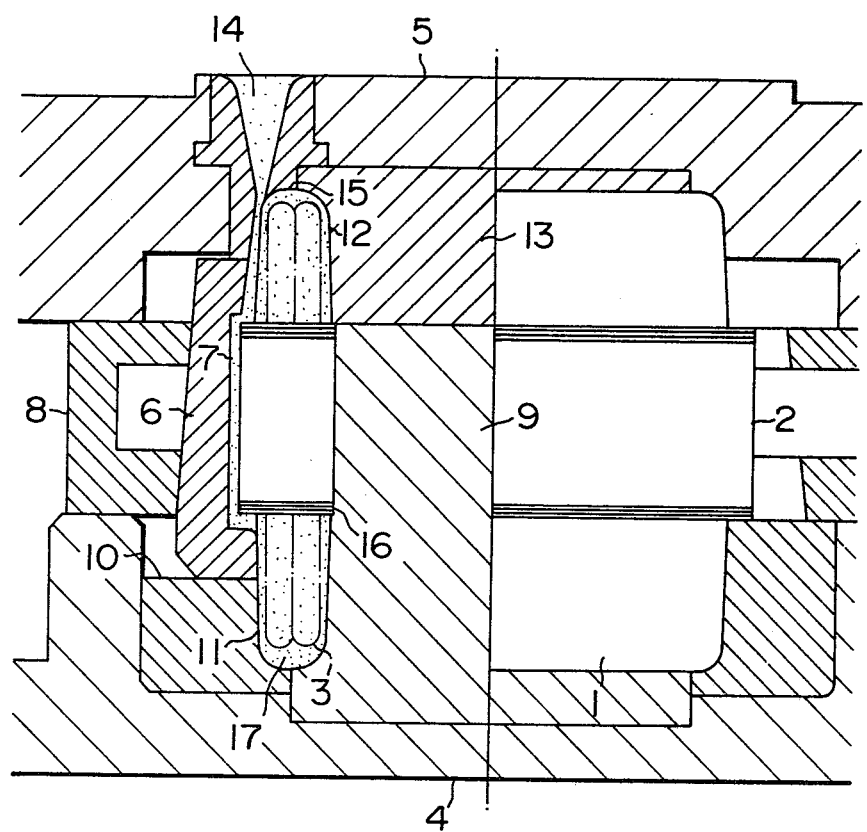
FIG. 1 is a fragmentary sectional view of a molding apparatus in explanation of an example of the prior art.
Figure 2:
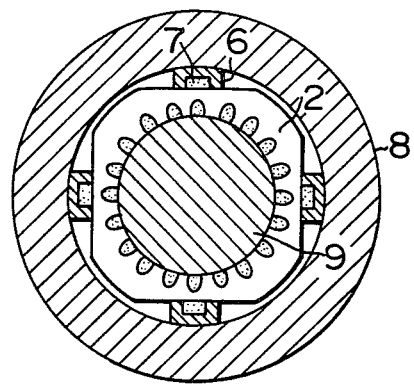
FIG. 2 is a sectional view showing the arrangement of the intermediate mold member of the molding apparatus shown in FIG. 1.

A first embodiment of the invention will now be described by referring to FIGS. 3 and 4. The mold includes an upper mold member 20 and a lower mold member 27 forming a pair. The upper mold member 20 is formed with an inner wall surface 22 in spaced juxtaposed relation to an upper coil end of a stator 1 in a manner to form a space 21 surrounding the upper coil end, and an undersurface 23 which is dimensioned such that it is in intimate contact with an end surface of a stator core 2 which is outwardly of the upper coil end. The lower mold member 27 is formed with an inner wall surface 29 in spaced juxtaposed relation to a lower coil end of the stator 1 in a manner to form a space 28 surrounding the lower coil end. The lower mold member 27 has an upper surface 30 which is dimensioned such that it is in intimate contact with an end surface of the stator core 2 which is outwardly of the lower coil end. Additionally, the lower mold member 27 is formed with a core 31 disposed in the central portion thereof. The core 31 is suitably dimensioned in such a manner that when it is fitted to the inner peripheral surface of the stator core 2 and the stator 1 is set on the lower mold member 27, and end surface 32 of the core 31 is disposed in a position in which it is substantially flush with the upper end surface of the stator core 2. Moreover, when the stator 1 is set between the upper mold member 20 and the lower mold member 27, there is a slight clearance between the end surface 32 of the core 31 and a lower end surface 24 of the central portion of the upper mold member 20. That is, the upper mold member 20 and the lower mold member 27 are dimensioned such that the end surfaces 24 and 32 are not in direct abutment against each other because the stator core 2 held between the upper and lower mold members 20 and 27 has a predetermined allowable error in the thickness obtained when the stator core 2 is held between the mold members 20 and 27. The upper and lower mold members 20 and 27 are formed with a sprue 25 runners 26 and runners 33 for supplying a resinous material therethrough. More specifically, the sprue 25 extends through the upper mold member 20 and opens at the end surface 32. The runners 26 are continuous with the sprue 25 and radially arranged from the center of the upper mold member 20 along the end surface 24, to communicate with the space 21 through a gate 34. The runners 33 are formed in the core 31. For example, the runners 33 may be in the form of grooves formed on the cylindrical surface of the core 31 and disposed radially of the stator core 2 to open at the inner peripheral side thereof, which are connected at one end to the runners 26 and communicated at the other end with the space 28 through gate 35. The plurality of runners 33 are arranged in positions which do not interfere with a slot 40 opening at the inner peripheral side of the stator core 2.

Small radial grooves are formed on the undersurface 23 of the upper mold member 20 or on the upper surface 30 of the lower mold member 27, to evacuate the spaces 21 and 28 of the upper and lower mold members 20 and 27 respectively when the resinous material is injected into the mold.

Operation of molding the stator 1 by the molding apparatus of the aforesaid construction will be described. The two mold members 20 and 27 are separated from each other a distance large enough to fit the stator 1 to the lower mold member 27, either by moving the upper mold member 20 upwardly or by moving the lower mold member 27 downwardly. The stator core 2 is fitted at the inner peripheral side to the core 31 which is used as a guide to insert the stator core 2 until the lower end surface thereof abuts against the upper surface 30 of the lower mold member 27. Then the upper mold member 20 and the lower mold member 27 are moved toward each other until the upper end surface of the stator core 2 abuts against the undersurface of the upper mold member 20. Alternatively the stator 1 may be arranged on an extension of the core 31 and the two mold members 20 and 27 may be moved toward each other to hold the stator core 2 therebetween. The results are the same. The mold is closed by a applying suitable pressing force between the two mold members 20 and 27 to keep the spaces 21 and 28 airtight. Thereafter a thermosetting resinous material of high temperature is injected under high pressure into the sprue 25. The resinous material supplied through the sprue 25 flows through the runners 26 and gate 34 into the space 21, and through the runners 26, runners 33 and gate 35 into the space 28. The resinous material flowing into the spaces 21 and 28 fills them and permeates the coil 3 while at the same time filling the slot 40 of the stator core 2. At this time, the air in the upper mold member 20 and the lower mold member 27 is released therefrom through the small grooves, not shown, formed on the undersurface 23 of the upper mold member 20 or on the upper surface 30 of the lower mold member 27. Following setting of the resinous material, the stator 1 having the sprue 25, runners 26 and runners 33 attached thereto can be removed from the lower mold member 27 by separating the upper mold member 20 from the lower mold member 27. By applying a light impact to the sprue 25, runners 26 and runners 33 attached to the stator 1, they can be broken away. More specifically, since the sprue 25, runners 26 and runners 33 are connected to the stator 1 through the gates 34 and 35, the impact applied to the gages 34 and 35 breaks away the gates 34 and 35 to allow the runners 33 and other parts to be separated from the inner peripheral surface of the stator core 2. The runners 33 and other parts can be separated from the inner peripheral surface of the stator core 2 by forcing a cylindrical object against the inner peripheral surface of the stator core 2 or forcing an object of the same shape as the core 31 thereagainst and turning same.

The molding apparatus of the aforesaid construction and operation offers advantages over the prior art. For example, when the upper and lower mold members 20 and 27 are set up with the stator 1 being held therebetween, there is no risk of the two mold members 20 and 27 striking each other. Even if there are variations in the thickness of the stator core 2 when positioned in the mold, the spaces 21 and 28 formed in the two mold members 20 and 27 respectively can be maintained in an airtight condition which is necessary for the operation. More specifically, any variation in the thickness of the stator core 2 which might occur when it is positioned in the mold can be accommodated by positioning the undersurface 23 of the upper mold member 20 and the upper surface 30 of the lower mold member 27 against the lower end surface and the upper end surface respectively of the stator core 2. This permits a necessary airtightness to be imparted to the spaces 21 and 28 to avoid leaks of the resinous material from the mold at all times, so that the molding operation can be performed positively and readily without interruption. The arrangement that the runners 33 for supplying the resinous material to the space 28 remote from the sprue 25 are formed along the inner peripheral surface of the stator core 2 so as not to interfere with the slot 40 of the stator core 2 permits the runners 33 to be readily separated from the stator core 2 following removal of the stator 1 after molding. This has no adverse effects on other molded parts.

Figure 4:
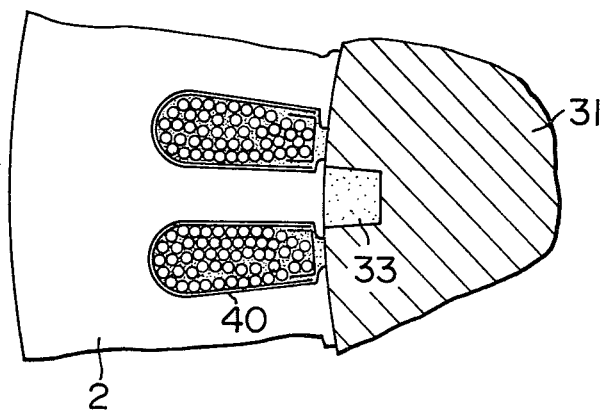
FIG. 4 is a sectional view in explanation of the positional relation between the runner of the molding apparatus and the slot of the stator core shown in FIG. 3.
Figure 3:
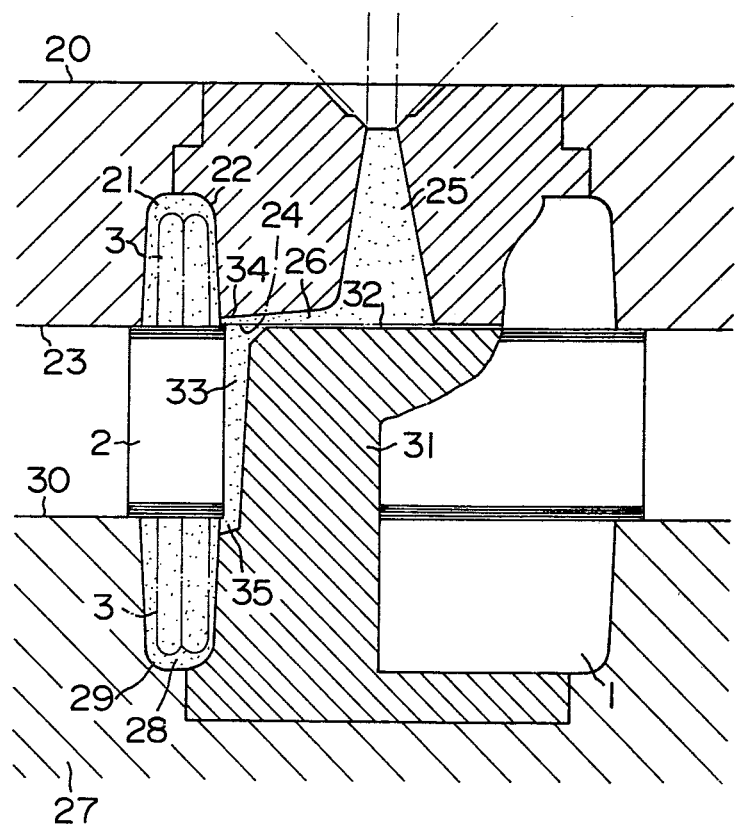
FIG. 3 is a fragmentary sectional view of the molding apparatus comprising one embodiment of the invention, in explanation of its construction.
Figure 5:
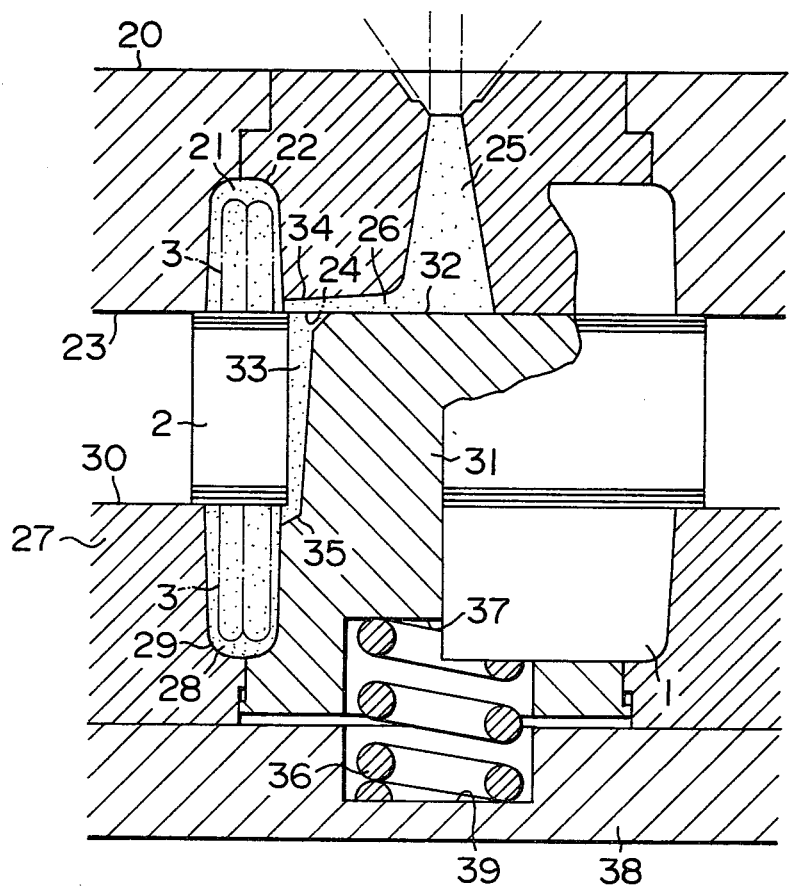
FIG. 5 is a fragmentary sectional view of the molding apparatus comprising another embodiment, in explanation of its construction.

FIG. 5 shows another embodiment in which parts similar to those shown in FIGS. 3 and 4 are designated by like reference characters and their description is omitted. The embodiment is more advantageous in accommodating variations in the thickness of the stator core that might occur when placed in the mold and in increasing the efficiency in utilizing resinous material. More specifically, the core 31 of the lower mold member 27 is split from the main body of the lower mold member 27 and a spring 36 is mounted therebetween to allow the core 31 to move freely, so that the end surface 32 of the core 31 abuts against the lower end surface 24 of the central portion of the upper mold member 20. In this condition, dislodging of the core 31 with respect to the lower mold member 27 is prevented. The spring 36 is mounted between an undersurface 37 of the core 31 and an upper surface 39 of a plate 38 disposed on the undersurface of the lower mold member 27. The spring 36 has a resilience such that when the upper and lower mold members 20 and 27 are closed, the spring 36 is compressed by a force lower than the clamping force applied to the closed mold and biased toward the lower mold member 27 while the end surface 32 of the core 31 is maintained in contact with the undersurface 24 of the upper mold member 20. A suitable spring constant is selected for the spring 36 so that the spring may not be compressed by the pressure under which the resinous material is forced into the cavity of the mold when molding is performed.

Operation of the second embodiment will now be described. The two mold members 20 and 27 are separated from each other a suitable distance and the stator 1 is fitted to the lower mold member 27 by using the core 31 as a guide. Then the two mold members 20 and 27 are moved toward each other. This brings the end surface of the core 31 into abutting engagement with the undersurface 24 of the upper mold member 20. Further movement of the two mold members 20 and 27 toward each other causes the upper mold member 20 to force the core 31 back toward the lower mold member 27. A predetermined mold clamping force is applied to the two mold members 20 and 27 to absorb any variation that might occur in the thickness of the stator core 2 placed in the mold. Then a heated thermosetting resinous material is injected under pressure into the sprue 25. The path of flow of the resinous material and the process steps to be followed following injection of the resinous material are as described by referring to the first embodiment, so that the description thereof will be omitted.

The additional advantage offered by this embodiment is that no gap except for the runners 26 exist between the end surface 32 of the core 31 and the undersurface 24 of the upper mold member 20, making it possible to minimize the amount of resinous material that might remain in the mold and form burrs. This is conductive to increased efficiency in utilization of the resinous material. The arrangement that the core 31 can be moved freely enables molding to be performed while maintaining the cavity of the mold in necessary airtight condition, even if there is a variation in the thickness of the stator core 2 when placed in the closed mold.

From the foregoing description, it will be appreciated that the molding apparatus according to the invention comprises an upper mold member and a lower mold member forming a pair, and runners for introducing a resinous material arranged on the inner side of the stator core. The molding apparatus according to the invention is simple in construction and low in cost. The time required for fitting the stator to the mold and removing same therefrom can be shortened. An additional advantage is that any variation in the thickness of the stator core that might occur when placed in the closed mold can be accommodated to enable molding to be performed continuously without interruption, thereby greatly increasing productivity.

What is claimed is:

1. A molding apparatus for a stator of an electric rotary machine comprising:
    a first mold member enclosing one coil end of the stator including a stator core and a coil wound thereon with a clearance therebetween and positioned against one end surface of the stator core disposed outwardly of said one coil end;
    a second mold member set on the inner periphery of the stator core and enclosing the other coil end of the stator with a clearance therebetween while being positioned against other end surface of the stator core disposed outwardly of said the other coil end; and
    at least one runner formed on said second mold member for communicating a first space formed between said first mold member and said one coil end with a second space formed between said second mold member and said the other coil end.

2. A molding apparatus for a stator of an electric rotary machine comprising:
    a first mold member enclosing one coil end of the stator including a stator core and a coil wound thereon with a clearance therebetween and positioned against one end surface of the stator core disposed outwardly of said one coil end;
    a second mold member set on the inner periphery of the stator core and enclosing the other coil end of the stator with a clearance therebetween while being positioned against the other end surface of the stator core disposed outwardly of said the other coil end, said second mold member being prevented from coming into direct contact with the first mold member when the stator core is held between the two mold members; and
    at least one of runner formed along the surface of said second mold member and opening at the inner peripheral surface of the stator core for communicating a first space formed between the first mold member and said one coil end with a space formed between the second mold member and said the other coil end.

3. A molding apparatus as claimed in claim 2, wherein said runners formed on said second mold member are disposed along the cylindrical surface of the core set on the inner periphery of the stator core.

4. A molding apparatus as claimed in claim 2 or 3, wherein said runners open at the inner peripheral surface of the stator core other than the position of the opening of a slot of the stator core.

5. A molding apparatus for a stator of a rotary electric machine comprising:
- a first mold member enclosing one coil end of the stator including a stator core and a coil wound thereon with a clearance therebetween and positioned against one end surface of the stator core disposed outwardly of said one coil end;
- a second mold member set on the inner periphery of the stator core and enclosing the other coil end of the stator with a clearance therebetween while being positioned against the other end surface of the stator core disposed outwardly of said the other coil end, said second mold member being constructed such that when the stator core is held between the first mold member and the second mold member in a closed mold position a portion of the second mold member fitted to the inner periphery of the stator core is prevented from striking the first mold member with a force higher than a mold clamping force applied to the closed mold; and
- at least one of runner formed along the surface of said second mold member and opening at the inner peripheral surface of the stator core for communicating a first space formed between said first mold member and said one coil end with a second space formed between said second mold member and said the other coil end.

6. A molding apparatus as claimed in claim 5, wherein said second mold member includes a core fitted to the inner periphery of the stator core, and a spring member for forcing said core against the first mold member with a biasing force lower than the clamping force applied to the closed mold members.

7. A molding apparatus as claimed in claim 5 or 6, wherein said runners open at the inner peripheral surface of the stator core other than the position of the opening of a slot of the stator core.

* * * * *